March 24, 1931.　　　A. BOUSFIELD　　　1,797,852
WHEEL LOAD SCALE
Filed April 9. 1927　　4 Sheets-Sheet 1

INVENTOR
Alfred Bousfield
BY
Henry Sherman
ATTORNEY

March 24, 1931.  A. BOUSFIELD  1,797,852
WHEEL LOAD SCALE
Filed April 9, 1927  4 Sheets-Sheet 2

INVENTOR
Alfred Bousfield
BY
*Henry Sherman*
ATTORNEY

March 24, 1931.         A. BOUSFIELD         1,797,852
WHEEL LOAD SCALE
Filed April 9, 1927         4 Sheets-Sheet 3
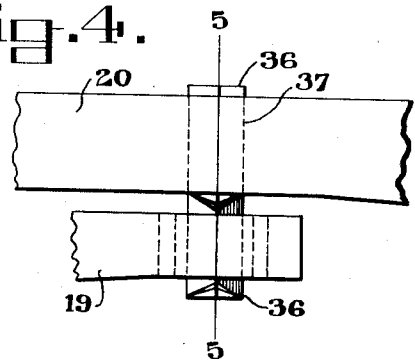
Fig.4.
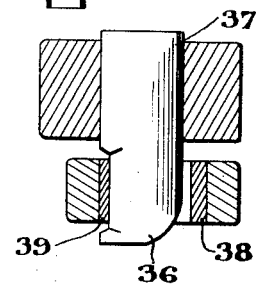
Fig.5.
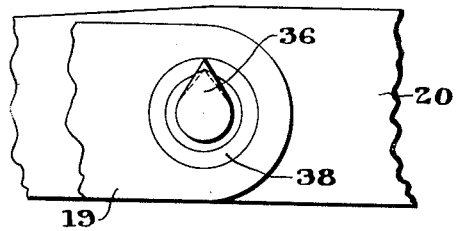
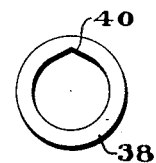
Fig.6.         Fig.7.
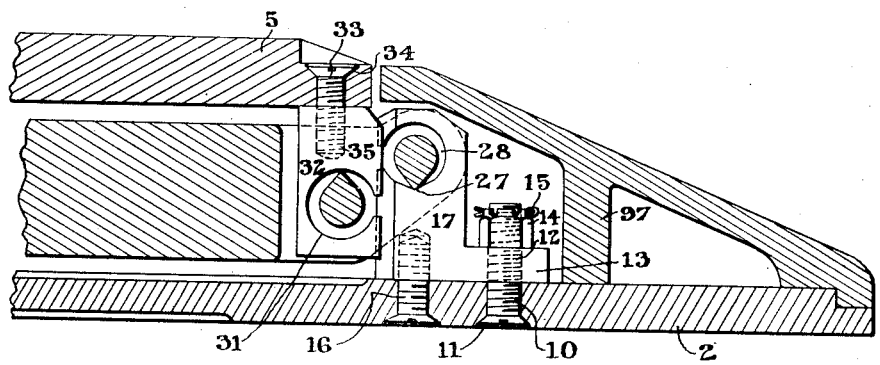
Fig.8.
INVENTOR
Alfred Bousfield
BY
Henry Sherman
ATTORNEY

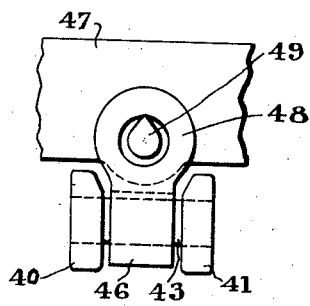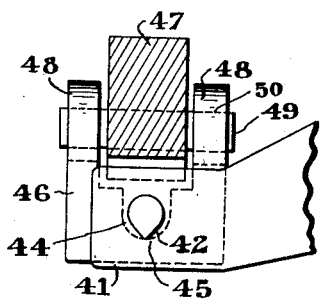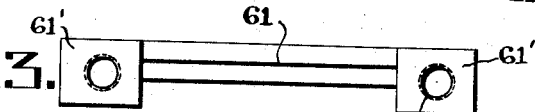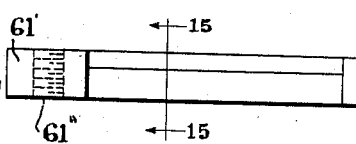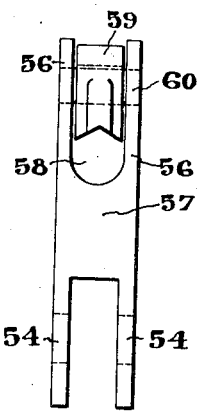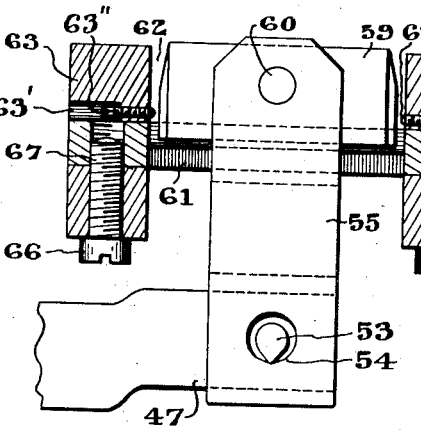

Patented Mar. 24, 1931

1,797,852

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

WHEEL-LOAD SCALE

Application filed April 9, 1927. Serial No. 182,361.

This invention relates to portable scales and more particularly to portable scales of the type employed in determining the wheel load of a vehicle, such as a motor truck.

Devices of the class referred to, as heretofore commonly constructed, embodied the hydrostatic principle, the load exerting a pressure upon a fluid suitably contained and the weight of the load being read by means of a fluid pressure indicator connected to the body of the fluid under pressure. One disadvantage of such construction resides in the fact that there must be frequent adjustments to compensate for leakage and evaporation of the fluid.

Another objection to wheel load weighing devices embodying the hydrostatic principle is due to the variations in the readings on the fluid pressure indicator caused by difference in temperature. Temperature changes have caused discrepancies of several hundred pounds in the pressure indicator reading. Obviously, it would be more than one associates with conceptions of accuracy, even in the weighing of heavy loads for which scales of this type are adapted.

A further disadvantage of the hydrostatic type of wheel load weighing devices arises from the fact that the construction of the pressure indicator, which is an important adjunct in this type of scale, does not lend itself to the rough handling to which it must necessarily be subjected.

Accordingly, due to the very nature of the construction of the weighing instrumentalities embodying the hydrostatic principle and the peculiar conditions under which they are used, none of these disturbing interferences can be avoided; hence the unreliability of the wheel load weighing devices of the hydrostatic type.

It is an object of this invention to provide an improved portable scale adapted to weigh the wheel load of vehicles which will be free from the above-mentioned and other disadvantages and which will be simple, durable, and inexpensive in construction and efficient and accurate in operation.

Another object of this invention is the provision of a wheel load scale wherein a system of levers is arranged in a housing having a small area and a short vertical dimension in order that the scale shall be especially adapted for the convenient manipulation by hand and the mounting to the platform thereof by the loaded motor truck, or other vehicle, without difficulty.

In one aspect, this invention comprises a scale wherein the levers are arranged in such a manner as to permit the use of very short fulcrums, which arrangement results in a high multiplication in the levers which is necessary to reduce the load quickly.

Another important feature of invention relates to the improvements in the connection between the long main lever and the short lever, wherein a hardened steel bushing at the end of each short lever directly engages with a center pivot; this feature economizing depth.

Still another feature of this invention relates to the improvements in the novel means for connecting the long main lever with the extension lever, whereby the vertical dimension of the scale is kept to a minimum.

Still another feature of this invention resides in the novel means for connecting the extension lever to the beam of the scale.

An important feature of the invention resides in the means for manipulating the scale when in service, wherein a hand grip is positioned on the base of the scale in such a manner as to allow the scale to be conveniently swung by one hand.

Other features of the invention, together with certain details of construction and combination of parts, will be discussed in the specification and pointed out in the appended claim.

In the accompanying drawings:

Fig. 4 is a plan view of the connection between the long main lever and the short lever;

Fig. 5 is a cross-section on line 5—5 in Fig. 4;

Fig. 6 is an end elevation of the connection between the long main lever and the short lever;

Fig. 7 is a detail view of the hardened steel bearings;

Fig. 8 is a cross-sectional view of the scale on line 8—8 in Fig. 1, showing the relation of the lever fulcrum stands to the platform bearings and the mounting of the same;

Fig. 9 is a detail view of the connection between the long main lever and the extension;

Fig. 10 is another view of the same;

Fig. 11 is a side elevation of the connection between the extension lever and the beam;

Fig. 12 is a detail elevational view of the same;

Fig. 13 is a plan view of the pivots used in the beam butt;

Fig. 14 is a side view of the same; and

Fig. 15 is a cross-section taken on line 15—15 of Fig. 14.

Figure 1:
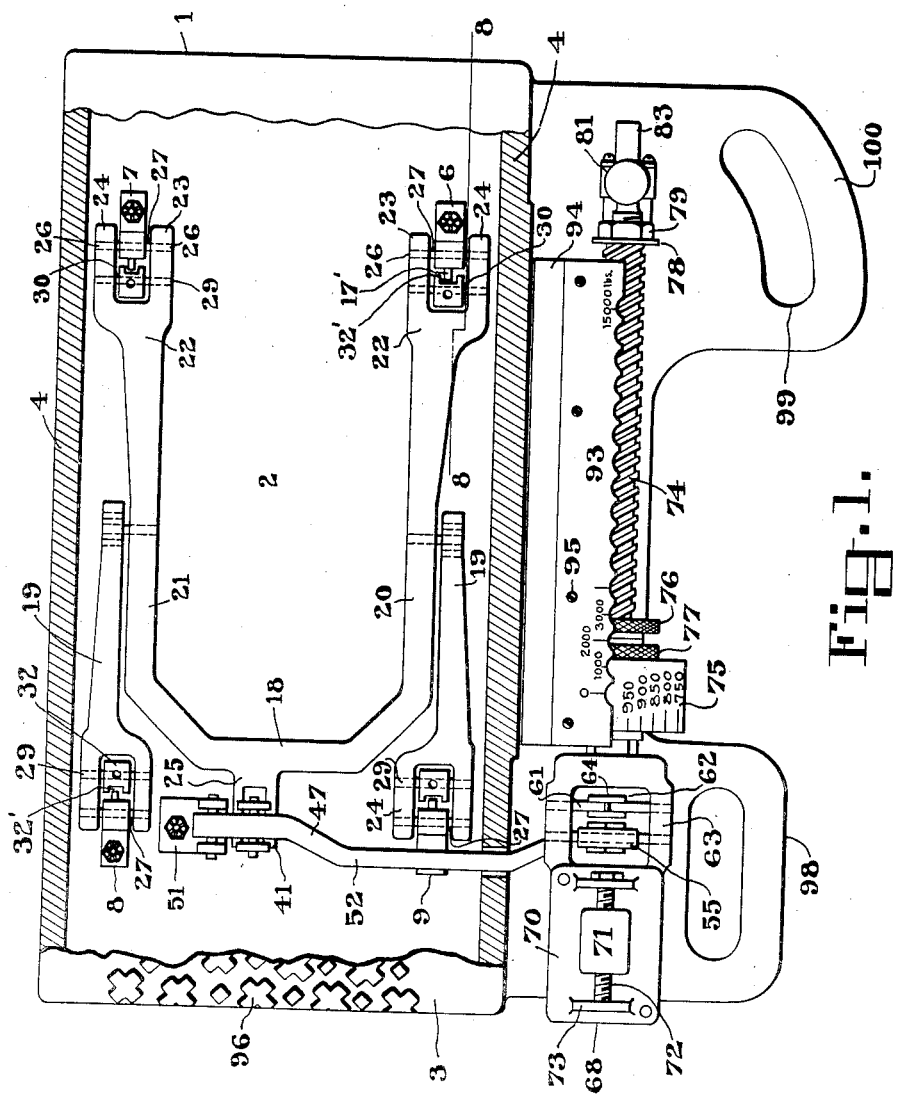
Fig. 1 is a plan view of the device with the side cover plates broken away and the platform removed.
Figure 2:
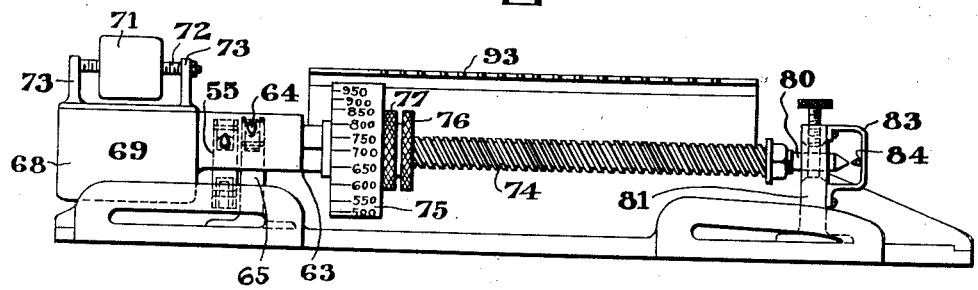
Fig. 2 is a side elevation of the device.
Figure 3:
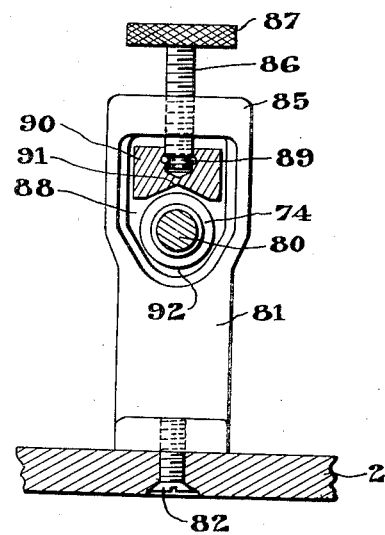
Fig. 3 is a side view of the trig stand with the locking block and tip of the beam in section.

In the illustrative device there is shown a housing of small area and short vertical dimension 1 comprising a base 2, a cover plate 3, having depending flanges 4 and a platform 5. As a scale of this type must be manually portable, the housing 1 is preferably a casting of an aluminum alloy. This casting is heat treated in order that a high tensile strength might be given to the aluminum alloy since this scale must be of a sufficient strength to support the wheel of the heaviest type of motor truck fully loaded.

Mounted on the base are the lever fulcrum stands 6, 7, 8 and 9 of low vertical height. In the illustrated embodiment of the invention, the lever fulcrum stands are attached to the base by means of a bolt 10 extending through the tapped holes 11 and 12, in the base and the horizontal portion 13 of the stands, respectively, the bolt being locked in portion by a castellated nut 14 and a cotter pin 15, as is well understood in the art. To prevent any pivotal motion about the bolt 10, a screw 16 is threaded through the base and vertical portion 17 of the fulcrum lever stand and locked in place by any suitable means. The vertical portion 17 has a rib 17'.

The lever stands 6 and 7 have fulcrumed thereon a long main lever generally designated by the reference character 18 and the lever stands 8 and 9 have fulcrumed thereon the short levers 19, 19.

The long main lever 18 comprises two arms 20 and 21 having thickened portions 22 at their ends, which are bifurcated to form fingers 23 and 24 straddling the vertical portions 17 of the lever stands. The long main lever also comprises a short arm 25, the purpose of which will be hereinafter set forth.

The short levers 19, 19, as an inspection of the drawings will disclose, being similar in structure to a long arm 20 or 21 of the main lever 18, a discription of the long arm will suffice, it is believed, for both the short levers and long arms of the main lever.

As has previously been stated, the arm is bifurcated to form fingers. In each of these fingers is broached an aperture 26, these apertures being in horizontal alignment. Through the apertures 26, 26, is driven a knife edge 27. An important feature of this device resides in the fact that the knife edges 27 lie in the same horizontal plane.

In the vertical portion 17 and rib 17', of the lever stand, is formed an opening 28 (Figure 8) which constitutes a bearing for the knife edge pivots 27, which are fulcrumed therein. This construction precludes the displacing or dislodging the pivot from the bearings after the scale is assembled.

In each of the fingers of the arm is broached another aperture 29, 29, also in horizontal alignment for the reception of a load bearing knife edge 30.

These load bearing knife edges are all in the same horizontal plane. The plane of the load bearing knife edges is parallel to the plane of the fulcrumed knife edges, the plane of the load bearing knife edges being above the plane of the fulcrum knife edges. This structural feature is for the purpose of keeping the scale to a minimum height.

The load bearing knife edges on which are seated the bearings 31 extending longitudinally through the load bearing steel 32. The load bearing steels have a groove 32' vertically through one of its side faces. The grooves 32' of the bearing steels act as female members and the rib 17' of the fulcrum stands act as male members, this arrangement permitting the use of a very short fulcrum and resulting in a high multiplication in the levers, which reduces the load quickly.

Resting directly upon these steels is the platform 5. The platform is suitably attached to said steels, as by means of screws 33 extending through a countersunk opening 34 in the platform and into a threaded opening 35 in the load bearing steel. The screw may be locked in position by any suitable means.

As has been previously set forth, the long main lever and the short levers are similarly fulcrumed on the fulcrum stands, and each of the bifurcated portions of the levers has pivoted therein a load bearing steel to which the platform is attached.

An important feature of this invention, and one which is for the purpose of further economizing height in the scale, resides in the provision of a connection between the long main and the short levers, the connection being a departure from the conventional expedient of connecting two levers by means of two pivots and a loop. This arrangement as shown in the illustrated embodiment of the invention, is formed by driving a pivot 36 through a broached opening 37 in the arms 20, 21 of main lever 18, substantially midway between ends of said arms and resting thereon a bushing 38 which is fitted into the opening 39 in the end of the short lever remote from the fulcrumed portion. Referring to Fig. 7, it will be observed that the bushing or bearing ring 38 has a V-notch in its cover surface extending longitudinally thereof. The V-notch in the bearing ring or bushing performs the function of keeping the multiplication of the levers to a constant.

The short arm or tip 25 of the main lever is also bifurcated forming the fingers 40, 41 in each of which is broached an opening 42 through which is driven a knife edge 43. The knife edge rests in a depression 44 in the cross-piece 45 of the loop 46, as is shown in Fig. 10. This important feature in the loop structure also serves to economize height in the scale.

The loop 46 is suspended from and connected to an extension lever 47 by means of eyes, or bearings 48, resting on a knife edge 49 driven through the broached openings 50 in the butt end of the extension lever.

The extension lever is fulcrumed in the lever stand 51 which is mounted on base 2 and attached thereto by means similar to that employed in attaching the other lever stands. As is shown in Fig. 1, the extension lever is offset at 52 in order to economize on longitudinal dimension.

The tip of the extension lever carries a knife edge lever 53 (Fig. 11) resting on bearings 54, 54, in the lower portion of a connection 55 which comprises two side walls 56, 56 joined substantially centrally thereof by an integral cross piece 57 which has a concave portion 58. In the upper portion of the connection 55 is swiveled a steel bearing 59 upon an axis 60, fixed in the side walls of the connection. This bearing 59 is self-aligning in one plane.

The steel bearing acts as a bearing for a knife edge 61 in an opening 62 in the butt end of a beam, designated generally by the reference character 63, which is fulcrumed at 64 on the fulcrum stand 65. The knife edge 61 is formed integrally with end portions 61', having screw threaded apertures 61'', formed in said end portions. The knife edge 61 is offset with relation to the longitudinal center line of the end portions, as is shown in Fig. 15.

In the butt end of the beam are apertures 63' and smaller screw threaded apertures 63''. In the latter apertures are inserted anti-friction screws 62'. These anti-friction screws may be adjusted to aperture 63', as is well understood. The screw 62' reduces the end-wise friction of the bearing steel 59 against the beam butt 63. The knife edge is held in position by means of screws 66 threaded in apertures 67 and 61''.

The beam comprises a butt 68, a portion of which is hollowed out to form a pocket, or cup, 69, for the purpose of receiving lead for the initial balance of the scale. The pocket 69 is covered by means of a plate 70, suitably attached thereto. The cover plate supports a balance ball 71, movably mounted on a rod 72, carried by a pair of supports 73, 73, the purpose of said balance ball mounted on the rear, or butt, end of the beam is for precisely balancing the beam in zero or no load position, as is well understood in the art.

To the butt of the beam is attached a multiple thread screw 74, which carries the poise 75, to which are attached a take-up nut 76 and a locking nut 77, the purpose of these nuts being to compensate for any wear in the threads, as is well understood in the art. A washer 78 and nut 79 are placed onto the tip end of the beam to mark the limit of travel of the poise. The tip 80 of the beam is integral with the threaded portion of the beam and extends through a trig stand 81 with which the top co-operates to indicate balance position of the beam.

The trig stand which is attached to the base 2 by any suitable means as by screws, carries a guard bracket 83 on which is mounted an indicator 84 to more accurately indicate the balance position of the beam.

Through the top portion 85 of the trig stand is threaded a thumb screw 86, the finger piece 87 of which is knurled. At the end of thumb screw and within the opening 88 of the trig stand is swiveled at 89 a locking block 90 having a V grooved in a face thereof. The V-grooved locking block co-operates with the depression 92 in the trig stand to lock the beam when the scale is not in service.

In the illustrated embodiment of the invention the poise is shown graduated in fifty-pound graduations, while the serrated face plate 93 is graduated in 1000-pound graduations. The poise co-operates with the face plate to indicate the weight of the load on the scale platform. It is to be understood, however, that the poise and face plate may be graduated in any suitable units. The face plate 93 is attached to the beam guard 94 by means of screws, the guard being attached to the housing in any suitable manner.

The cover plates of the housing are inclined to facilitate the climbing of the loaded vehicle to the platform of the scale. The corner plates and platform are embossed in the manner shown at 96 in order to afford the vehicle better traction. A crosspiece 97 rests on the base and supports the cover plate to strengthen the same.

The scale is conveniently carried about by means of handles or grips, 98 and 99, integral with the base casting. The grips are at an angle to the horizontal plane of the base of the scale, and one of these handles, namely, the one designated by the reference character 99, is also at an angle to a plane extending through the transverse axis of the scale, the gripping portion 100 of this handle being arcuate in contour. The arrangement of the handle 99 in this position is for the purpose of enabling one to swing the scale conveniently by one hand.

In use, the scale and a block of any suitable material, such as iron or wood, of the same height as the scale platform, are placed in front of the wheels to be weighed, and the truck, or other vehicle, is driven onto them. The block is for the purpose of keeping the truck level, which is essential to the accurate weighing of the wheel loads.

Having thus described my invention, what I claim as new and desire to secure by Letters Patent in the United States, is:

1. In a wheel load scale, a system of levers for weighing the load comprising a long lever, a plurality of short levers pivoted thereon and an extension lever to which said long lever is connected, said extension lever having an offset portion.

2. In a wheel load scale, a system of levers for weighing the load comprising a long lever, a plurality of short levers pivoted thereon and an extension lever, to which said long lever is connected, said extension lever having an offset portion intermediate its ends.

3. In a wheel load scale, the combination with a long lever having a knife edge thereon, of an extension lever having a knife edge thereon, and a connection between said knife edges comprising a loop having a slotted portion therein.

4. In a wheel load scale, the combination with a long lever having a knife edge thereon, of an extension lever having a knife edge thereon, and a connection between said knife edges comprising a loop having a slot in the lower portion thereof, said slot adapted to form a bearing for knife edge on the long lever.

5. In a wheel load scale, the combination with a long lever and an extension lever, of a connection between said levers comprising a loop having a slotted portion therein, one of said levers being pivoted in said slotted portion.

6. In a wheel load scale, the combination with a long lever and an extension lever, of a connection between said levers comprising a loop having a slotted portion in the top thereof, one of said levers being pivoted in said slotted portion.

7. In a wheel load scale, in combination, a lever, a knife edge in said lever, and a second lever having a bearing fulcrumed on said knife edge, said bearing comprising a ring.

8. In a wheel load scale, in combination, a lever, a knife edge in said lever, and a second lever having a bearing adapted to be fulcrumed on said knife edge, said bearing comprising a ring having a notch therein.

9. In a wheel load scale, in combination, a long lever having a plurality of arms, a knife edge in each of said arms, and a plurality of short levers having bearings therein fulcrumed on said knife edges, said bearing comprising a bushing having a notch formed thereon.

10. In a wheel load scale, a base, a lever stand mounted on said base, a transverse lever fulcrumed on said stand, a second lever stand, a beam fulcrumed thereon, and means to connect said lever and said beam, said means comprising an H-shaped connecting element.

11. In a wheel load scale, in combination with an extension lever and a beam, of a means to connect said extension lever to said beam, said means comprising an element composed of a plurality of lateral walls connected intermediate their ends by a cross-piece.

12. In a wheel load scale, a base, and a handle on said base, said handle being arcuate in form and at an angle to the plane of the base.

13. In a wheel load scale, a base, and a plurality of handles on said base, one of said handles being at an angle to the plane of the base and to the other handle.

14. In a wheel load scale, a base, lever stands mounted on said base, said lever stands each having a rib thereon, levers fulcrumed on said stands, and bearing steels fulcrumed on said levers, said bearing steels having grooves therein, the rib of the lever stand being adapted to extend into the grooves of the bearing steel.

15. In a wheel load scale, a base, lever stands mounted on said base, said lever stands each having a rib thereon, levers fulcrumed on said stands, and bearing steels fulcrumed on said levers, said bearing steels having grooves therein, the rib of the lever stand being adapted to partially extend into the grooves of the bearing steel.

16. In a device of the character described, the combination with a lever system, of a beam connected thereto, said beam comprising a butt having a pocket therein, a cover for said pocket, and a support for a balance ball integral with said cover.

17. In a device of the character described, the combination with a lever system, of a beam connected thereto comprising a butt and a screw attached thereto, a pocket in said butt, a cover for said pocket, and a support for a balance ball integral with said cover.

18. In a device of the character described, the combination with a lever system, of a beam connected thereto, said beam comprising a butt and a screw attached thereto, and a poise movable along said screw and means on said poise adapted to prevent back-lash.

19. In a device of the character described, the combination with a lever system, of a beam connected thereto comprising a butt and a screw attached thereto, a poise movable on said screw, and means on said poise to prevent back-lash, said means comprising a take-up nut and a locking nut, disposed in juxtaposition to each other on one side of the said poise and coacting together in compensating for any wear of the said screw.

20. In a device of the character described, the combination with a lever system, of a beam connected thereto and means to clamp said beam comprising a vertically movable screw having a block swivelly mounted thereon.

21. In a device of the character described, the combination with a lever system, of a beam connected thereto, and means to clamp said beam comprising a vertically movable screw having a block swivelly mounted thereon, said block having a V-groove therein.

22. In a device of the character described, the combination with a base and a lever system mounted thereon, of a beam connected thereto, a trig stand mounted on said base, and means for clamping said beam comprising a screw vertically movable in said trig stand and a clamping block swivelly mounted on said screw.

ALFRED BOUSFIELD.